(«12») United States Patent
Engels et al.

(10) Patent No.: US 9,551,115 B2
(45) Date of Patent: Jan. 24, 2017

(54) TRANSITION ON THE FLY

(71) Applicant: Wirtgen GmbH, Windhagen (DE)

(72) Inventors: Michael Engels, Obererbach (DE);
Matthias Fritz, Linz (Rhein) (DE);
Martin Lenz, Grossmaischeid (DE);
Cyrus Barimani, Konigswinter (DE);
Günter Hähn, Konigswinter (DE)

(73) Assignee: Wirtgen GmbH (DE)

( * ) Notice: Subject to any disclaimer, the term of this patent is extended or adjusted under 35 U.S.C. 154(b) by 139 days.

(21) Appl. No.: 14/576,399

(22) Filed: Dec. 19, 2014

(65) Prior Publication Data

US 2016/0177517 A1    Jun. 23, 2016

(51) Int. Cl.
| | |
|---|---|
| *E01C 19/00* | (2006.01) |
| *E01C 19/42* | (2006.01) |
| *E01C 19/48* | (2006.01) |
| *B60R 1/00* | (2006.01) |
| *G06K 9/52* | (2006.01) |
| *G06T 7/20* | (2006.01) |
| *G06T 7/60* | (2006.01) |

(52) U.S. Cl.
CPC .............. *E01C 19/004* (2013.01); *B60R 1/00* (2013.01); *E01C 19/002* (2013.01); *E01C 19/42* (2013.01); *E01C 19/48* (2013.01); *E01C 19/4893* (2013.01); *G06K 9/52* (2013.01); *G06T 7/20* (2013.01); *G06T 7/60* (2013.01); *E01C 2301/18* (2013.01)

(58) Field of Classification Search
CPC ........................... E01C 19/002; E01C 19/4886
USPC ..................... 404/84.1, 84.2, 84.5, 84.8, 105
See application file for complete search history.

(56) References Cited

U.S. PATENT DOCUMENTS

| | | | | |
|---|---|---|---|---|
| 3,970,405 A | * | 7/1976 | Swisher, Jr. ......... | E01C 19/405 404/105 |
| 4,900,186 A | * | 2/1990 | Swisher, Jr. ............ | E01C 19/48 404/104 |
| 5,615,972 A | * | 4/1997 | Guntert ................... | E01C 19/40 404/101 |
| 5,941,658 A | * | 8/1999 | Dahlinger ............. | E01C 19/008 172/4.5 |

(Continued)

FOREIGN PATENT DOCUMENTS

| | | |
|---|---|---|
| DE | 19814052 A1 | 10/1999 |
| DE | 29918747 U1 | 2/2000 |

(Continued)

OTHER PUBLICATIONS

European Search Report in corresponding European Patent Application No. EP 15 20 1078, dated May 12, 2016, 8 pp. (not prior art).

(Continued)

*Primary Examiner* — Gary Hartmann
(74) *Attorney, Agent, or Firm* — Lucian Wayne Beavers; Patterson Intellectual Property Law PC

(57) ABSTRACT

A system for varying the width of a molded concrete slab on the fly as the slab is being molded. Position and height of the paving machine relative to an external reference system are determined and controlled using at least two 3D stringless reference objects. An additional sensor provides a signal corresponding to a frame width and thus a concrete slab width, and an actuator controls the frame width actively as the paving machine advances.

26 Claims, 11 Drawing Sheets

(56) References Cited

U.S. PATENT DOCUMENTS

| | | | |
|---|---|---|---|
| 6,082,927 A * | 7/2000 | Dahlinger | E01C 19/008 |
| | | | 172/4.5 |
| 6,457,779 B1 | 10/2002 | Busley et al. | |
| 6,471,442 B1 | 10/2002 | Deeb et al. | |
| 6,582,152 B2 * | 6/2003 | Leone | E01C 19/42 |
| | | | 404/105 |
| 6,954,999 B1 | 10/2005 | Richardson et al. | |
| 8,571,794 B2 | 10/2013 | Roberts et al. | |
| 8,788,154 B2 | 7/2014 | O'Connor et al. | |
| 8,794,868 B2 | 8/2014 | Fritz | |
| 8,967,908 B1 * | 3/2015 | Thieme | E01C 19/002 |
| | | | 404/118 |
| 9,121,141 B2 * | 9/2015 | Thieme | E01C 19/002 |
| 9,388,537 B2 * | 7/2016 | Dahm | E01C 19/004 |
| 9,388,538 B2 * | 7/2016 | Dahm | E01C 19/4886 |
| 9,388,539 B2 * | 7/2016 | Dahm | E01C 19/4886 |
| 2006/0198700 A1 | 9/2006 | Maier et al. | |
| 2014/0074295 A1 | 3/2014 | Kumagai et al. | |
| 2016/0177519 A1 * | 6/2016 | Fritz | E01C 19/42 |
| | | | 404/84.5 |

FOREIGN PATENT DOCUMENTS

| | | |
|---|---|---|
| DE | 112005003046 B4 | 2/2014 |
| EP | 1118713 A1 | 7/2001 |
| EP | 2006448 A1 | 12/2008 |
| EP | 2708968 A2 | 3/2014 |
| EP | 2708969 A2 | 3/2014 |
| WO | 2006092441 A1 | 9/2006 |

OTHER PUBLICATIONS

Leica Geosystems Machine Control Solutions brochure, Leica Geosystems AG, Heerbrugg, Switzerland, 19 pp. (undated but admitted to be prior art).

* cited by examiner

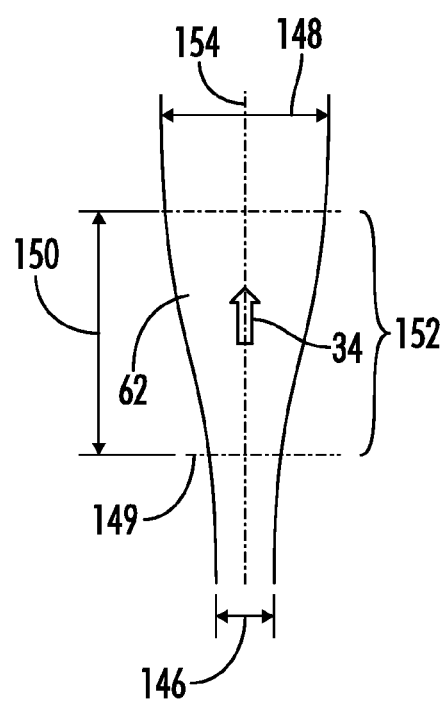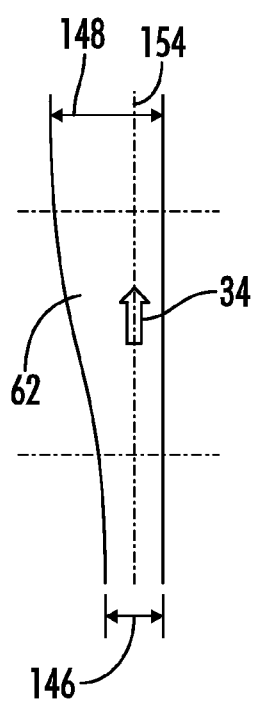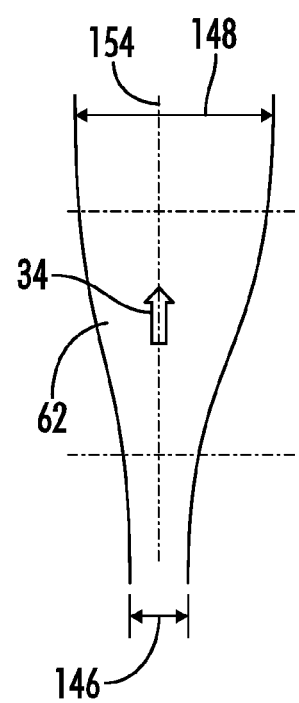
*FIG. 8A*   *FIG. 8B*   *FIG. 8C*

TRANSITION ON THE FLY

BACKGROUND OF THE INVENTION

1. Field of the Invention

The present invention relates generally to control systems for slipform paving machines and more particularly, but not by way of limitation, to a system for controlling the position of the slipform paving machine while simultaneously controlling changes in paving width as the machine moves forward during a paving operation.

2. Description of the Prior Art

In construction machines for forming structures on a ground surface, such as a concrete slipform paving machine, important factors include the control of the height of the working implements and thus the grade or height of the concrete structure being molded, and the control of the steering direction of the machine.

Such slipform paving machines typically take a reference reading from a stringline which has been placed on one or both sides of the intended path of the machine. In the past, when it has been desired to create a molded concrete structure having a transition from one structure width to a second structure width, two stringlines have been laid out on either side of the desired path of the machine, and the change in width of the concrete structure is created by varying the width between the two stringlines.

Another previously used technique is to have a single stringline on one side of the slipform paving machine, and to manually telescope the machine to control changes in width on the second side of the machine. In this case the height on the second side might be controlled by a slope sensor.

There is a continuing need for improved systems to allow for transition in paving width during a slipform paving operation.

SUMMARY OF THE INVENTION

A slipform paving machine apparatus is disclosed including a machine frame having first and second side frame members. The machine frame is variable in frame width. At least one ground engaging unit, such as a track or wheel, is provided on each side of the machine. At least one of the ground engaging units is steerable. Front and rear first side height adjustable supports support the first side frame member from at least one first side ground engaging unit. At least one second side height adjustable support supports the second side frame member from at least one second side ground engaging unit. A mold is supported from the machine frame beneath the machine frame and laterally between the at least one first side ground engaging unit and the at least one second side ground engaging unit. The mold is configured to mold concrete into a concrete structure having an upper surface and lateral concrete sides as the machine moves forward in an operating direction. The mold is variable in width so as to vary a paving width of the concrete structure. At least two three-dimensional (3D) stringless reference objects are configured to correspond to positions of at least two points on the machine frame relative to an external reference system. A width actuator is configured to vary the paving width. A width sensor is configured to generate a width signal corresponding to a change in the paving width. A controller is configured to receive input signals corresponding to the positions of the 3D stringless reference objects in the external reference system, and to receive the width signal from the width sensor. The controller is also configured to control height adjustment of one or more of the height adjustable supports, to control steering of the at least one steerable ground engaging unit, and to control the width actuator so that the paving width can be varied as the machine moves forward in the operating direction.

In another aspect, a method is disclosed of operating a slipform paving machine. The method may include the steps of:

(a) providing a slipform paving machine including:
  a main frame module and at least one laterally extendable side frame member, the at least one laterally extendable side frame member being laterally extendable relative to the main frame module to vary a frame width;
  at least one first side ground engaging unit and at least one second side ground engaging unit;
  front and rear first side height adjustable supports supporting the machine frame from the at least one first side ground engaging unit;
  at least one second side height adjustable support supporting the machine frame from the at least one second side ground engaging unit; and
  a concrete mold supported from the machine frame beneath the machine frame and laterally between the at least one first side ground engaging unit and the at least one second side ground engaging unit, the mold having a variable mold width;

(b) moving the slipform paving machine forward in an operating direction and molding concrete into a concrete slab structure extending between the ground engaging units and behind the concrete mold, the structure having an upper surface and lateral concrete sides;

(c) during step (b) sensing a location in an external reference system of at least two 3D stringless reference objects, each of the objects being fixed relative to at least one of the main frame module and the at least one laterally extendable side frame member;

(d) controlling a direction and height of the machine frame with an automatic control system in response to signals corresponding to the locations of the two 3D stringless reference objects; and (e) during step (b) continuously adjusting the mold width from a first slab width to a second slab width and forming a continuous transition in the concrete slab structure.

In either of the above embodiments a distance between the at least two 3D reference objects may either be fixed, or may be variable.

When the distance between the at least two 3D reference objects is variable, the width sensor may comprise a controller module configured to detect the distance between the at least two 3D stringless reference objects based upon the input signals corresponding to the positions of the at least two 3D stringless reference objects in the external reference system. In this embodiment, and additional width sensor may optionally also be used.

In another aspect of the invention a slipform paving machine apparatus includes a machine frame having a main frame module and at least one laterally extendable side frame member. The at least one laterally extendable side frame member is laterally extendable relative to the main frame module to vary a frame width. At least one first side ground engaging unit and at least one second side ground engaging unit are provided. Front and rear first side height adjustable supports support the machine frame from the at least one first side ground engaging unit. At least one second side height adjustable support supports the machine frame from the at least one second side ground engaging unit. A variable width mold is supported from the machine frame beneath the machine frame and laterally between the at least one first side ground engaging unit and the at least one second side ground engaging unit. The mold is configured to mold concrete into a concrete structure having an upper surface and lateral concrete sides as the machine moves forward in an operating direction. The machine includes at least two 3D stringless reference objects configured to correspond to positions of the objects relative to an external reference system. The machine further includes a carrier frame having the at least two 3D stringless reference objects fixedly attached to the carrier frame so that a distance between the at least two 3D stringless reference objects is fixed. The carrier frame is supported from at least one of the main frame module and the at least one laterally movable side frame member.

In any of the above embodiments the mold may be attached to the machine frame such that the mold width varies as the frame width is varied.

The mold may also be supported from the machine frame in such a manner that to some degree the mold width can be varied independent of the frame width.

In any of the above embodiments both of the side frame members may be laterally movable relative to the main frame module to vary the frame width.

In any of the above embodiments the width sensor may comprise an additional 3D stringless reference object mounted on the machine frame such that the additional 3D stringless reference object moves relative to the at least two 3D stringless reference objects when the frame width is varied.

In any of the above embodiments the width sensor may comprise an extension sensor associated with the width actuator or with the machine frame or with the mold for detecting an extension of the width actuator.

In any of the above embodiments the width sensor may comprise a stringline sensor mounted on the machine frame such that the stringline sensor moves relative to the at least two 3D stringless reference objects when the frame width is varied, so that a stringline fixed in the external reference system can be used to control changes in frame width.

The at least two 3D stringless reference objects may be spaced apart longitudinally with a spacing component parallel to the operating direction.

The at least two 3D stringless reference objects may be longitudinally fixed relative to one of the side frames.

The at least two 3D stringless reference objects may be longitudinally fixed relative to the main frame module.

The at least two 3D stringless reference objects may be spaced apart laterally with a spacing component perpendicular to the operating direction.

The at least two 3D stringless reference objects may be laterally fixed relative to the main frame module.

The at least two 3D stringless reference objects may be laterally fixed relative to one of the laterally movable side frame members.

The machine may further include a carrier frame having the at least two 3D stringless reference objects fixedly attached to the carrier frame so that a distance between the at least two 3D stringless reference objects is fixed. The carrier frame may be fixed relative to either the main frame module or one of the laterally movable side frame members.

In any of the above embodiments including the carrier frame, the carrier frame may be fixed to one of the laterally movable side frame members, and the machine may further include a traveling support between the carrier frame and the main frame module for supporting the carrier frame from the main frame module while allowing relative lateral movement between the carrier frame and the main frame module.

In any of the above embodiments the at least two 3D stringless reference objects may include global navigation satellite system (GNSS) sensors.

In any of the above embodiments the at least two 3D stringless reference objects may include reflectors for a ground based optical surveying system.

In any of the above embodiments one of the at least two 3D stringless reference objects may include a global navigation satellite system (GNSS) sensor and the other of the at least two 3D stringless reference objects may include a reflector for a ground based optical surveying system.

In any of the above embodiments the slipform paving machine may include a cross slope sensor mounted on the machine frame, and the controller may be configured to generate a cross slope adjustment signal to control a cross slope of the machine frame by adjustment of one or more of the height adjustable supports.

In any of the above embodiments the width actuator may include a piston and cylinder configured to extend and contract the frame width.

In any of the above embodiments the width actuator may include a steering system configured to steer the ground engaging units relative to each other so as to vary the frame width.

Numerous objects, features and advantages of the present invention will be readily apparent to those skilled in the art upon a reading of the following disclosure when taken in conjunction with the accompanying drawings.

BRIEF DESCRIPTION OF THE DRAWINGS

FIG. 8A is a schematic plan view showing a molded concrete structure increasing in width symmetrically on both sides of a main paving path.

FIG. 8B is a view similar to FIG. 8A showing a change in width to one side of a main paving path.

FIG. 8C is a view similar to FIG. 8A showing a non-symmetrical expansion in width to both sides of a main paving path.

DETAILED DESCRIPTION

Figure 1:
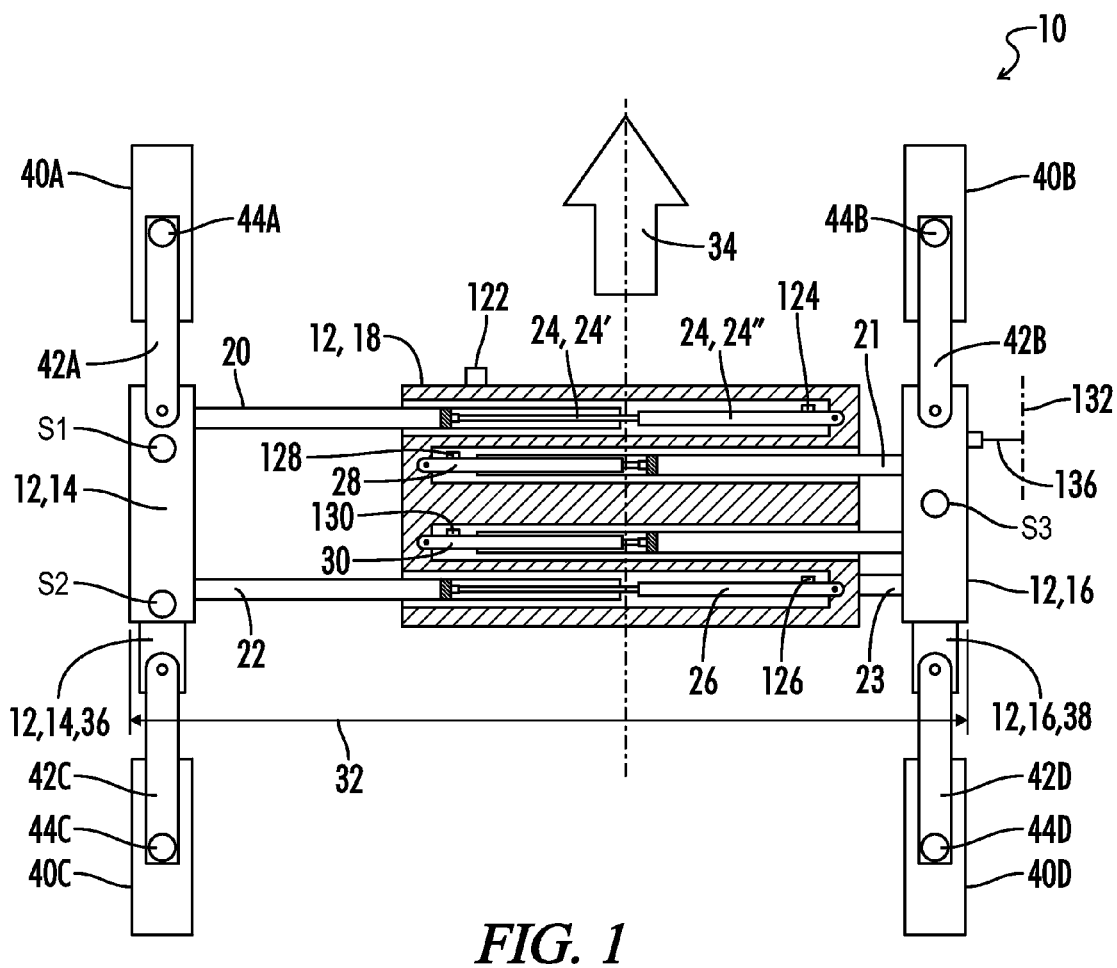
FIG. 1 is a schematic plan view of a first embodiment of a slipform paving machine having a main frame module and having left and right side frame members both laterally extendable relative to the main frame module. The side frame members are also longitudinally extendable to extend the length of the slipform paving machine.

FIG. 1 schematically illustrates a slipform paving machine apparatus 10 including a machine frame 12. The machine frame 12 includes first and second side frame members 14 and 16 which are laterally extendable relative to a main frame module 18. The first and second side frame members 14 and 16 may also be referred to as left and right side frame members 14 and 16.

The first side frame member 14 is attached to forward and rear male telescoping members 20 and 22 which are received within the main frame module 18 in a telescoping manner. Forward and rear left side actuating rams 24 and 26 are connected between the main frame module 18 and the left side frame member 14 to control lateral extension and retraction of the left side frame member 14 relative to the main frame module 18.

Forward and rearward male telescoping members 21 and 23 are similarly attached to the right side frame member 16 and are telescopingly received in the main frame module 18. Forward and rear right side actuating rams 28 and 30 are connected between the main frame module 18 and the right side frame member 16 to control lateral extension and retraction of the right side frame member 16 relative to the main frame module 18.

The rams 24, 26, 28 and 30 may all be referred to as width actuators configured to vary a distance between the side frame members 14 and 16 and to thereby vary a frame width 32. Each of the rams such as 24 includes a piston 24' and a cylinder 24" configured to expand and contract the frame width 32. It will be understood that the width actuators do not have to be hydraulic rams. Electric linear actuators, rotary actuators, and any other suitable actuators may be used.

The side frame members 14 and 16 are also constructed so as to be adjustable in length parallel to a paving direction or operating direction indicated by the arrow 34. Thus the first or left side frame member 14 includes a rearwardly extendable first side frame portion 36 and the second or right side frame member 16 includes a rearwardly extendable right side frame portion 38.

The paving machine 10 includes four ground engaging units 40A, 40B, 40C and 40D which in the illustrated embodiment are crawler tracks. Wheels could also be used as ground engaging units. The machine frame 12 further includes four frame swing arms 42A, 42B, 42C and 42D which are pivotally attached to the machine frame 12 and which carry the ground engaging units 40A-40D at their outer ends.

Associated with each of the ground engaging units 40A-40D are height adjustable supports or lifting columns 44A, 44B, 44C and 44D. In the embodiment of FIG. 1, front and rear first side height adjustable supports 44A and 44C, respectively, support the first side frame member 14 from the ground engaging units 40A and 40C, respectively. Front and rear second side height adjustable supports 44B and 44D support the second side frame member 16 from the ground engaging units 40B and 40D, respectively.

Figure 2:
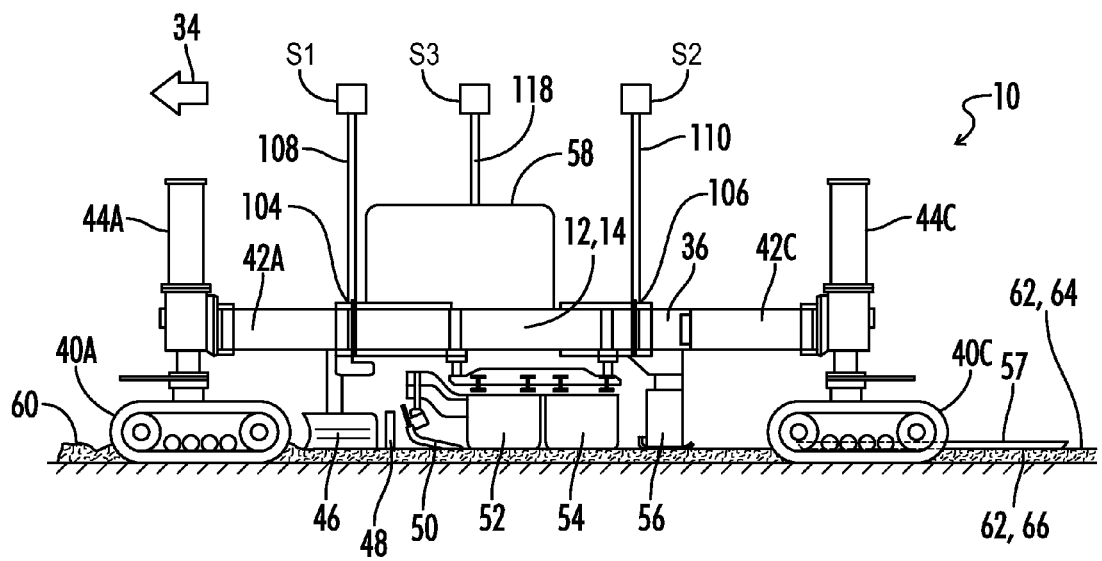
FIG. 2 is a left side elevation view of the slipform paving machine of FIG. 1.
Figure 3:
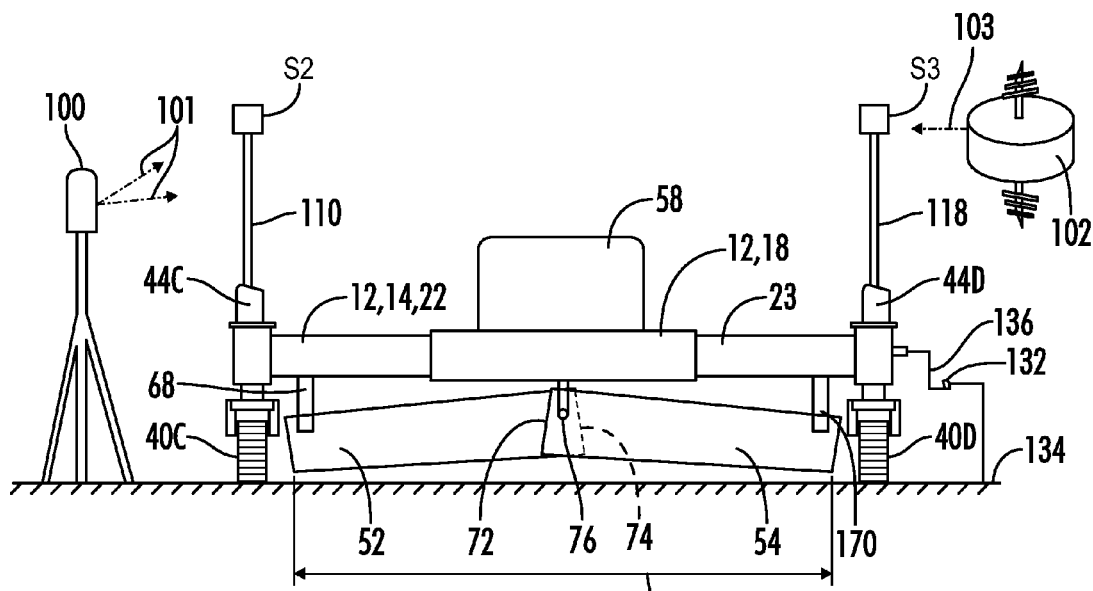
FIG. 3 is a rear elevation view of the slipform paving machine of FIGS. 1 and 2.

Further features of the slipform paving machine 10 are seen in FIGS. 2 and 3. As seen in FIG. 2, a number of tools are carried by the machine frame 12, including a plow or concrete spreader 46, a front wall 48, a system of vibrators or concrete liquefying devices 50, first and second mold portions 52 and 54, an oscillating beam 56 and a super smoother 57. Other components such as a dowel bar inserter (not shown) may also be supported from the slipform paving machine.

Also carried on the machine frame 12 is a tractor operations module 58 which may include a diesel engine for powering the various hydraulic and electrical systems, a control platform, an operator station and the like.

As is seen in FIG. 2, a mass of concrete 60 is placed in front of the slipform paving machine 10 and then the various components just described, and particularly the mold 52, 54, forms the concrete 60 into a molded concrete structure 62 having an upper surface 64 and having formed sides such as 66.

The mold 52, 54 may be described as a variable width mold supported from the machine frame 12 beneath the machine frame 12 and laterally between the ground engaging units 40A and 40C on the left side and the ground engaging units 40B and 40D on the right side. The mold 52, 54 is configured to mold the concrete 60 into the concrete structure 62 having an upper surface 64 and lateral concrete sides such as 66 as the machine 10 moves forward in the operating direction 34. The forward and rearward mold portions 52 and 54 are attached to the machine frame 12 adjacent their laterally outer end portions by attachments such as 68 and 70. The inner ends 72 and 74 of mold portions 52 and 54 are slidably supported from a central vertical support 76 relative to frame 12. The central support 76 may be vertically adjusted to create a crown in the molded structure 62. The laterally inner end portions 72 and 74 overlap so that they may slide relative to each other as the frame width 32 of machine frame 12 is varied. Thus in the embodiment shown in FIGS. 1-3, variations in the frame width 32 result in variations in a mold width 78.

It will also be understood that the mold can be supported independently from the machine frame in such a manner that to a limited extent the mold width can be adjusted independently from the frame width. In either situation, a change in mold width will correspond to a change in paving width of the concrete structure being formed.

Figure 4:
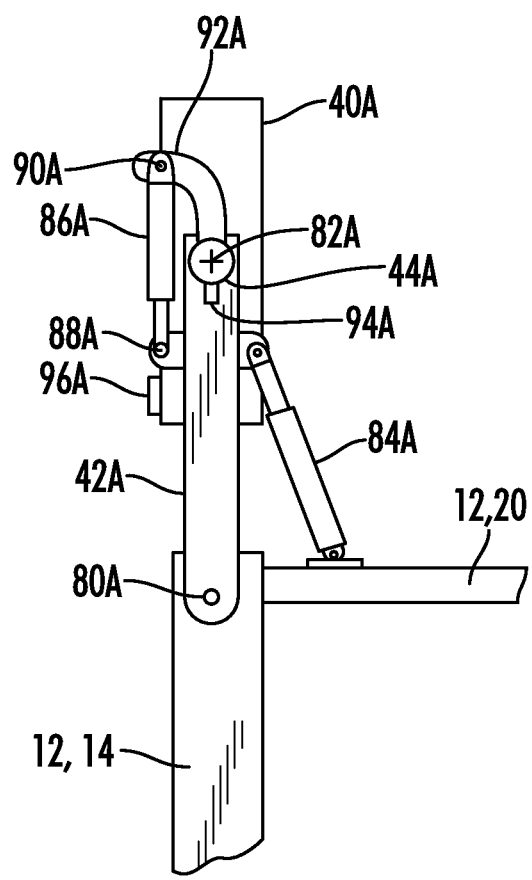
FIG. 4 is a schematic plan view of the details of the steering system and swing leg control system hardware associated with the left front swing leg and crawler track of the machine of FIG. 1.

As is best seen in FIG. 4, which is a schematic plan view of the crawler track and swing leg supporting the left front corner of the machine frame 12, each of the swing legs such as 42A is pivotally connected to the machine frame 12 at a pivot axis such as 80A. The crawler track or ground engaging unit 40A is steerably connected to the free end of the swing leg 42A and may be steered about a vertical axis 82A of the height adjustable lifting column 44A. A holding device 84A such as a hydraulic ram or turn buckle maintains the pivotal orientation of the swing leg 42A relative to the machine frame 12.

In the drawings, the swing legs 42 and holding devices 84 are schematically illustrated as being directly connected to the machine frame 12. It will be understood, however, that the swing legs and holding devices do not have to be directly connected to the machine frame 12. Instead, the swing legs and holding devices may be indirectly connected to the machine frame 12 by suitable mounting brackets. When one of these components is described herein as being connected to the machine frame 12, that includes both direct and indirect connections.

Steering of the crawler track 40A relative to the frame 12 about the vertical axis 82A is accomplished by extension and retraction of a hydraulic steering cylinder 86A pivotally connected at 88A to an intermediate location on the swing leg 42A and pivotally connected at 90A to a steering arm 92A connected to rotate with the ground engaging unit or crawler track 40A. Alternatively, instead of the use of a hydraulic ram steering cylinder 86A, the track 40A may be steered relative to the frame 12 by a rotary actuator such as a worm gear or slew gear drive. Also, an electric actuator may be used instead of a hydraulic actuator to steer the crawler track. Each of the crawler tracks such as 40A may have a steering sensor such as 94A associated therewith, which steering sensors are configured to detect the steering angles of their respective crawler tracks relative to their respective swing legs such as 42A. The steering sensors may for example each be an electromagnetic encoder commercially available from TWK-Elektronik GmbH, Heinrichstrasse 85, 40239 Dusseldorf, Germany, as Model TMA 50-SA180WSA16.

Each of the ground engaging units such as 40A may be a powered or driven ground engaging unit and may be powered such as by a hydraulic drive motor 96A.

Instead of or in addition to use of the rams 24, 26, 28 and 30 to vary the frame width 32, the tracks 40A, 40B, 40C and 40D may be steered relative to each other so as to aid in the lateral extension and contraction of the frame width. Details of construction of such a steering based frame extension and retraction arrangement are further set forth in U.S. patent application Ser. No. 14/299,893 entitled "Frame Width Adjustment By Steering" filed Jun. 9, 2014, the details of which are incorporated herein by reference.

Figure 12:
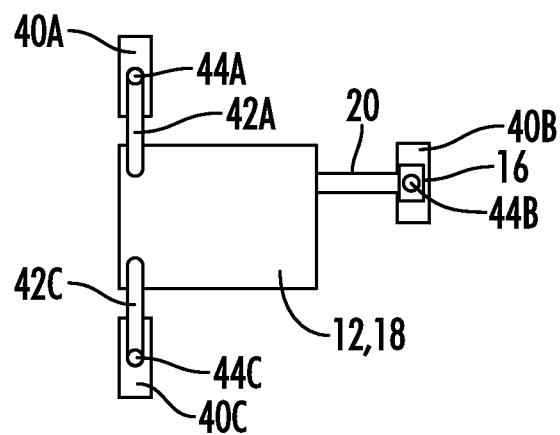
FIG. 12 is a schematic plan view of a three-track single telescoping slipform paver apparatus.

Although the embodiment shown in FIG. 1 illustrates a four track slipform paving machine, it will be understood that the principles set forth herein may also be utilized on two track or three track machines. For example, FIG. 12 schematically illustrates a three track single telescoping slipform paving machine. In the machine of FIG. 12, the three tracks 40A, 40B and 40C and related components are numbered analogous to the similar components of FIG. 1.

Guidance System

The slipform paving machine 10 is preferably guided using a three-dimensional (3D) stringless reference system which determines the position of the machine 10 relative to an external reference system external from the machine 10. One such system is the use of a ground based optical surveying system such as a total station 100 schematically illustrated in FIG. 3. Another such system is one of the global navigation satellite system (GNSS) systems, such as the GPS system utilized in North America. Such GNSS systems utilize signals from a plurality of satellites schematically illustrated as 102 in FIG. 3. Utilizing either of these systems, the objects which are attached to the machine frame and used with either the total station 100 or the GNSS satellites 102 to identify positions on the machine frame within the external reference system may be generally referred to as 3D stringless reference objects. Thus, in the embodiment shown in FIGS. 1-3, the slipform paving machine 10 is shown as including two 3D stringless reference objects S1 and S2, which in this embodiment are fixedly mounted on the left side frame member 12 and can be described as being spaced longitudinally apart with a spacing component parallel to the operating direction 34. As best seen in FIG. 2, the objects S1 and S2 are fixed relative to points 104 and 106 on machine 12 and are supported by masts 108 and 110.

It is noted that although the two 3D stringless reference objects S1 and S2 may be shown or described herein as being attached to the frame or some part of the frame, it is not required that those objects be physically attached directly to the frame members 12, 14, 16 or 18 identified herein. What is important is that the reference object be mounted so that it is fixed in position relative to the frame or other identified component. The reference objects may be physically mounted on other components that are fixed relative to the frame. For example, if the two mold components 52 and 54 are fixed to move with the left and right side frame members 14 and 16, respectively, then one or both of the reference objects could be mounted on the mold. Thus a reference object S1 or S2 configured to correspond to a position of a point on the machine frame may be physically mounted on the machine frame or may be mounted on another component that is fixed relative to that point on the machine frame.

When using a ground based optical surveying system such as a total station 100, the 3D stringless reference objects S1 and S2 may be reflectors or prisms which reflect optical signals 101 from the total station 100 back to the total station 100. In that case the total station 100 generates signals corresponding to the location of the reference objects S1 and S2 within the external reference system, and those signals are communicated via communication line 105 (see FIG. 9) to the controller 112 of the slipform paving machine 10 as further described below. The communication line 105 is schematic only, and it will be understood that such communication line may include wireless communications.

When using a GNSS system involving satellites such as 102, the 3D stringless reference objects S1 and S2 may be GNSS sensors which receive signals 103 from a plurality of satellites such as 102 and generate signals corresponding to the location of the reference objects S1 and S2 within the external reference system. Those signals generated by the GNSS sensors S1 and S2 are then communicated to the controller of the slipform paving machine 10 as further described below.

The signals from the total station 100 and/or signals from GNSS sensors S1 and S2 may all be referred to as input signals corresponding to the locations of the objects S1 and S2 within the external reference system.

As used herein, the word "stringless" in the term "3D stringless reference object" means that the reference object does not engage a stringline such as the stringline 132 shown in FIGS. 1 and 3.

Figure 9:
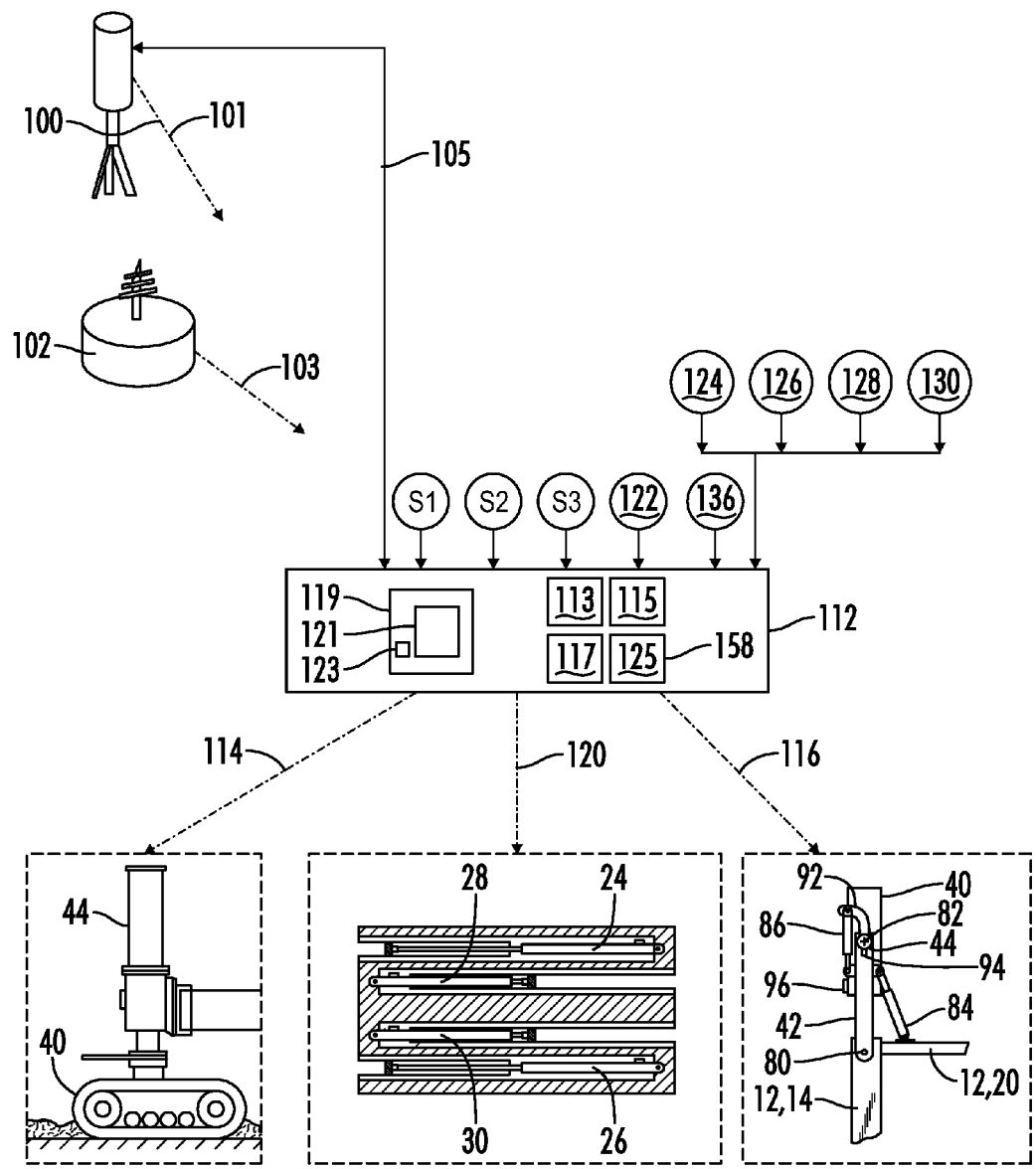
FIG. 9 is a schematic illustration of a control system associated with the slipform paving machine of either FIG. 1 or 5.

A controller 112 schematically illustrated in FIG. 9 receives the input signals corresponding to the locations of the objects S1 and S2 within the external reference system, and generates control signals directed to the front and rear left side adjustable columns 44A and 44C to control a height of the objects S1 and S2 and thus of the machine frame 12 at points 104 and 106 relative to the external reference system. Communication of height adjustment signals from the controller 112 to the height adjustable columns 44 of the machine 10 are schematically illustrated in FIG. 9 by communication line 114. It will be understood that the height adjustable columns 44 each include a hydraulic ram (not shown) actuated by a hydraulic control valve which controls flow of hydraulic fluid to and from the opposite sides of the hydraulic ram. The hydraulic control valves may be controlled by electrical signals conducted over communication line 114 from controller 112 in a known manner.

Similarly, the controller 112 may control the direction of the slipform paving machine 10 within the external reference system by steering of the ground engaging units 40 via their respective steering cylinders 86. Communication of such steering signals from controller 112 to the various steering cylinders 86 is schematically illustrated by communication line 116 shown in FIG. 9. Again, electrical steering signals may be communicated over communication line 116, to electrically actuate hydraulic control valves (not shown) which direct hydraulic fluid to and from the hydraulic rams 86 in a known manner to steer each of the ground engaging units 40.

Controller 112 includes a processor 113, a computer readable memory medium 115, a data base 117 and an input/output module or control panel 119 having a display 121. An input/output device 123, such as a keyboard or other user interface, is provided so that the human operator main input instructions to the controller. It is understood that the controller 112 described herein may be a single controller having all of the described functionality, or it may include multiple controllers wherein the described functionality is distributed among the multiple controllers.

The term "computer-readable memory medium" as used herein may refer to any non-transitory medium 115 alone or as one of a plurality of non-transitory memory media 115 within which is embodied a computer program product 125 that includes processor-executable software, instructions or program modules which upon execution may provide data or otherwise cause a computer system to implement subject matter or otherwise operate in a specific manner as further defined herein. It may further be understood that more than one type of memory media may be used in combination to conduct processor-executable software, instructions or program modules from a first memory medium upon which the software, instructions or program modules initially reside to a processor for execution.

"Memory media" as generally used herein may further include without limitation transmission media and/or storage media. "Storage media" may refer in an equivalent manner to volatile and non-volatile, removable and non-removable media, including at least dynamic memory, application specific integrated circuits (ASIC), chip memory devices, optical or magnetic disk memory devices, flash memory devices, or any other medium which may be used to stored data in a processor-accessible manner, and may unless otherwise stated either reside on a single computing platform or be distributed across a plurality of such platforms. "Transmission media" may include any tangible media effective to permit processor-executable software, instructions or program modules residing on the media to be read and executed by a processor, including without limitation wire, cable, fiber-optic and wireless media such as is known in the art.

The term "processor" as used herein may refer to at least general-purpose or specific-purpose processing devices and/or logic as may be understood by one of skill in the art, including but not limited to single- or multithreading processors, central processors, parent processors, graphical processors, media processors, and the like.

The slipform paving machine 10 further includes a width sensor S3 arranged to generate a width signal corresponding to a change in the frame width 32. In the embodiment illustrated in FIGS. 1-3, the width sensor S3 comprises an additional 3D stringless reference object S3. Thus, if the 3D reference objects S1 and S2 are reflectors for an optical based ground based external reference system such as total station 100, then the additional object S3 may also be a reflector or prism for such an optical based system. If, however, the objects S1 and S2 are GNSS sensors then the additional object S3 may also be a GNSS sensor. In the embodiment illustrated in FIGS. 1-3 the additional object S3 is fixedly mounted on right side frame member 16 by a mast 118.

It is also possible to use a mixture of reference objects, some being reflectors used with an optical system and some being GNSS sensors. For example, a total system 100 with reflectors S1 and S2 may be used for the first side 14 of the machine 10 as seen in FIG. 1 because of the high accuracy of such a system for determining the height of the machine frame 12, and at the same time a GNSS sensor S3 may be used to determine the location of the other side 16 of the frame. With such a system a cross slope sensor 122 may be used to accurately control the height of the other side 16 of the frame.

It will be appreciated that with position signals corresponding to the positions of the objects S1, S2 and S3 within the external reference system, the controller 112 can determine the frame width 32, and thus the additional object S3 may be generally described as a width sensor S3 arranged to generate a width signal corresponding to a change in the frame width 32.

The controller 112 communicates with the hydraulic rams 24, 26, 28 and 30 via communication line 120 as schematically illustrated in FIG. 9 to control the rams 24, 26, 28 and 30 so as to vary and to control the frame width 32. Controller 112 sends electrical control signals via communication line 120 to electrically actuated hydraulic valves (not shown) associated with each of the hydraulic rams 24, 26, 28 and 30, to direct hydraulic fluid to and from the rams 24, 26, 28 and 30 to control extension and retraction of the same in a known manner.

One or more cross slope sensors 122 may also be mounted on the machine frame, and provide an input signal to controller 112 as schematically illustrated in FIG. 9. In response to the cross slope signal from cross slope sensor 122, the controller 112 may vary the extension of one or more of the height adjustable supports 44 to adjust the cross slope of the slipform paving machine 10 to a desired value.

Alternative Width Sensors

In another embodiment, instead of or in addition to the additional reference object S3, a width sensor may be provided by extension sensors 124, 126, 128 and 130 associated with the actuator rams 24, 26, 28 and 30, respectively. In this embodiment, the height and location of the left side frame member 14 may be determined via reference objects S1 and S2, and the frame width 32 may be controlled via the extension sensors 124, 126, 128 and 130 and control of the extension of the rams 24, 26, 28 and 30.

Also, the extension sensors can be physically separate from the actuator rams. For example, separate extension sensors (not shown) can be connected between the main frame module 18 and each of the side frame members 14 and 16. Also there could be a single extension sensor extending between the side frame members 14 and 16.

In still another embodiment, instead of the additional 3D stringless reference object S3, a stringline 132 may be fixed in the external reference system relative to the ground 134. The right side frame member 16 may carry a stringline sensor 136 as schematically illustrated in FIGS. 1 and 3. Thus the stringline sensor 136 comprises the width sensor mounted on the machine 12, such that the stringline sensor 136 moves relative to the objects S1 and S2 when the frame width 32 is varied. The stringline sensor 136 may be a two-dimensional sensor, or may be used to locate the position of the right side of the slab 62 solely in the horizontal plane.

Alternative Reference Object Locations of FIGS. 6A-6F and 7A-7F

Figure 6A:
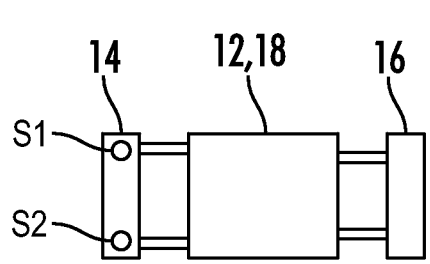
FIGS. 6A-6F comprise a set of schematic plan views illustrating alternative locations of the 3D stringless reference objects on a dual telescoping slipform paver apparatus like that of FIGS. 1-3.

In the embodiment seen in FIGS. 1 and 2, the two 3D stringless reference objects S1 and S2 are spaced apart longitudinally by a spacing component parallel to the operating direction 32. Those objects S1 and S2 are longitudinally fixed relative to the side frame member 14. This arrangement is schematically illustrated in FIG. 6A. It is noted that in the schematic illustrations of FIG. 6A-6F, only the frame members 14, 16 and 18 are shown, and the swing legs 42 and ground engaging units 40 have been deleted for ease of illustration.

Figure 6D:
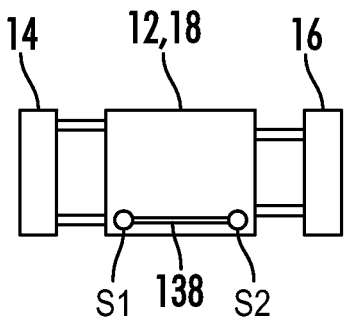
Figure 6B:
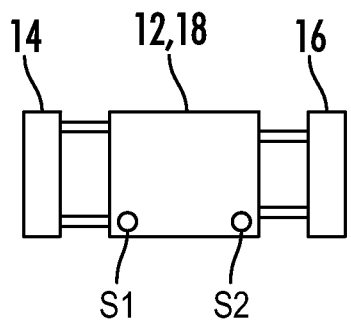
Figure 6E:
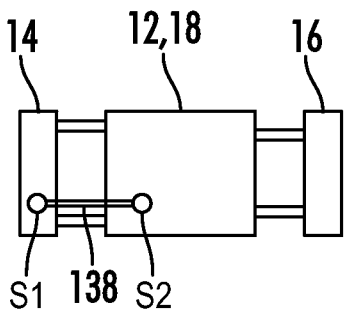
Figure 6C:
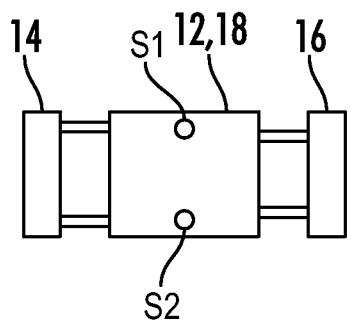

Alternatively, as seen in FIGS. 6B and 6C, the two 3D stringless reference objects S1 and S2 may be attached to the main frame module 18. In the embodiment of FIG. 6B, the objects S1 and S2 are spaced apart laterally with a spacing component perpendicular to the operating direction 34. In the embodiment of FIG. 6C, the objects S1 and S2 are spaced apart longitudinally.

Figure 3A:
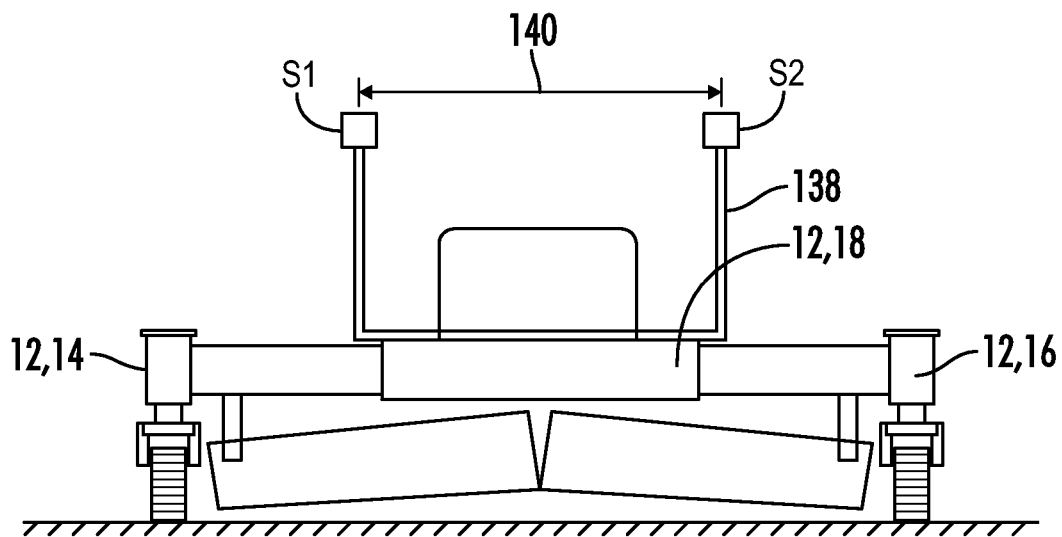
FIG. 3A is a view similar to FIG. 3 showing an alternative location of the 3D stringless reference objects carried by a carrier frame mounted on the main frame module.

Another embodiment is illustrated in FIG. 3A, wherein the slipform paving machine 10 includes a carrier frame 138. The objects S1 and S2 are fixedly attached to the carrier frame 138 so that a distance 140 between the objects S1 and S2 is fixed by the structure of the carrier frame 138. In the embodiment shown in FIG. 3A the carrier frame 138 is fixed relative to the main frame module 18. The embodiment of FIG. 3A is schematically illustrated in FIG. 6D.

Figure 3B:
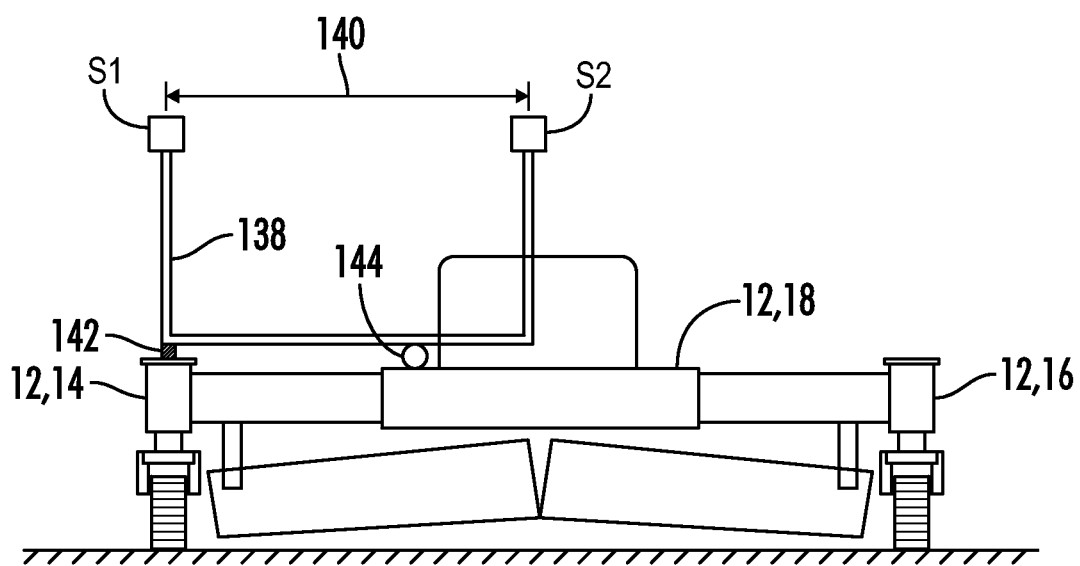
FIG. 3B is a view similar to FIG. 3 showing another alternative arrangement of the 3D reference objects mounted on a carrier frame fixed to the left side frame member and having a traveling support provided from the main frame module.

In another alternative embodiment shown in FIG. 3B, the carrier frame 138 is fixed at 142 to the left side frame member 14, and a traveling support 144 supports the carrier frame 138 from the main frame module 18 while allowing relative lateral movement between the carrier frame 138 and the main frame module 18. The traveling support 144 may be constructed as a rolling support using rollers or bearings. Alternatively, the traveling support 144 may be a sliding support providing a sliding bearing. The embodiment of FIG. 3B is schematically illustrated in FIG. 6E.

Figure 3C:
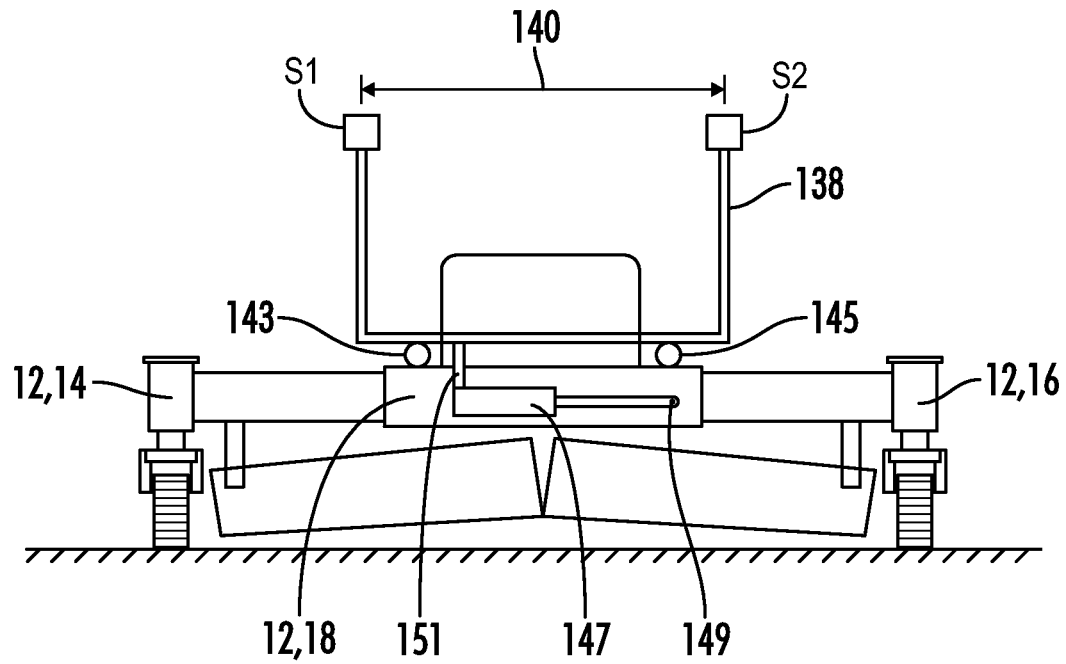
FIG. 3C is a view similar to FIG. 3B showing another alternative arrangement of the 3D reference objects mounted on the carrier frame, with the carrier frame being laterally adjustably positioned on the main frame module.
Figure 6F:
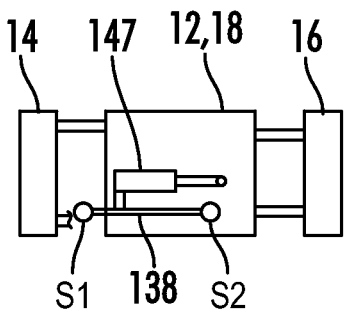

FIG. 3C illustrates still another embodiment wherein the carrier frame 138 is adjustably positioned on the main frame module 18 on travelling supports 143 and 145. An adjustment device 147 is connected to the main frame module 18 at 149 and to the carrier frame 138 at 151. Adjustment device 147 controls the lateral position of carrier frame 138 on the main frame module 18. This allows the carrier frame 138 to be maintained in a central location spanning a main trajectory 154 of the machine 10 as is further described below with regards to FIG. 8A. The embodiment of FIG. 3C is schematically illustrated in FIG. 6F.

In the various embodiments of FIGS. 6A-6F, the position and orientation of the frame 12 in the external reference system may be determined by information from the reference objects S1 and S2, and additional information from the width sensor in any of its embodiments described above. Also information from the cross slope sensor 122 may be utilized to further determine and control the cross slope of the frame 12.

Figure 5:
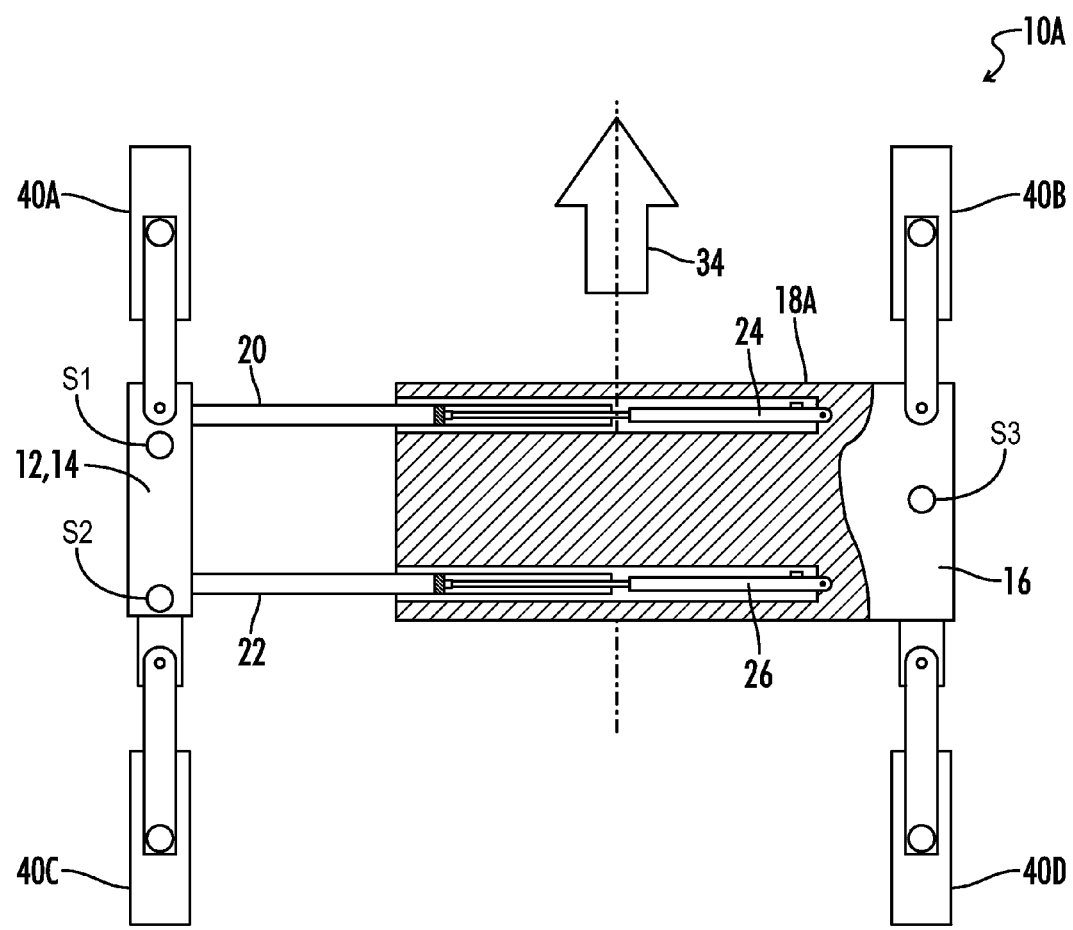
FIG. 5 is a schematic plan view similar to FIG. 1 showing an alternative embodiment of the slipform paving machine which is extendable in width to only the left side of the main frame module.

All of the embodiments described above in FIGS. 6A-6F have been with reference to the double telescoping frame 12 shown in FIG. 1. Additionally, similar control systems may be utilized with a modified slipform paving machine 10A as shown in FIG. 5 which telescopes only to the left hand side from its modified main frame module 18A. FIGS. 7A-7F schematically illustrate various possible positioning arrangements for the 3D stringless reference objects S1 and S2 on the slipform paving machine 10A. In the embodiments of FIG. 5 and FIGS. 7A-7F the second side frame member 16 is an integral part of the main frame module 18A.

In all of the embodiments the machine frame 12 may be described as including first and second side frame members 14 and 16. In the embodiments of FIG. 5 and FIGS. 7A-7F the machine frame may be described as including the main frame module 18A and having one side member 14 laterally movable relative to the main frame module. In the embodiments of FIGS. 1-3 and FIGS. 6A-6F the machine frame may be described as including the main frame module 18 and having both of the side frame members 14 and 16 laterally movable relative to the main frame module. All of the embodiments may be described as having at least one of the side frame members laterally movable relative to the main frame module.

Figure 7A:
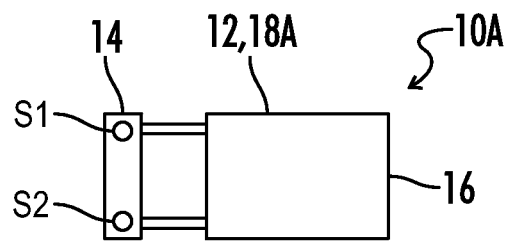
FIGS. 7A-7F comprise a set of schematic plan views illustrating alternative locations of the 3D stringless reference objects on a single telescoping slipform paver apparatus like that of FIG. 5.

In FIG. 7A, the reference objects S1 and S2 are fixed to the left side frame member 14 and are longitudinally spaced apart.

Figure 7D:
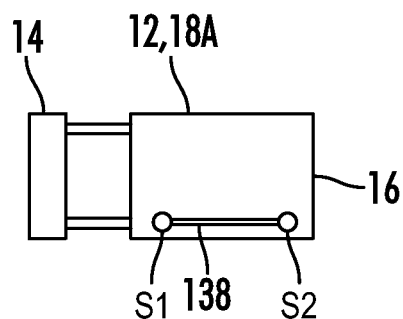
Figure 7B:
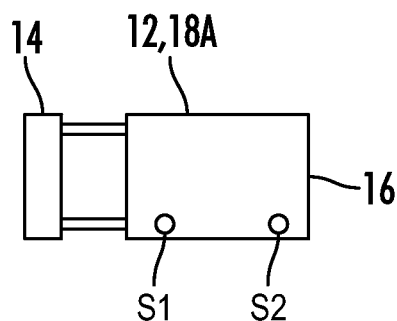

In the embodiment of FIG. 7B, the reference objects S1 and S2 are fixed to the main frame module 18A and are transversely spaced apart.

Figure 7E:
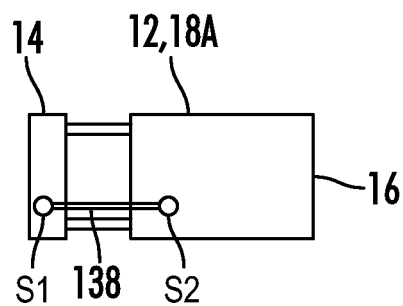
Figure 7C:
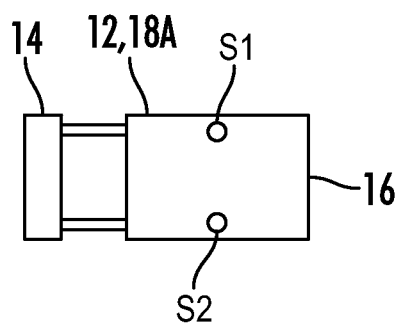

In the embodiment of FIG. 7C, the reference objects S1 and S2 are fixed on the main frame module 18A and are longitudinally spaced apart.

In FIG. 7D, the reference objects S1 and S2 are mounted on carrier frame 138 which is fixed to the main frame module 18A.

In the embodiment of FIG. 7E, the reference objects S1 and S2 are fixed to the carrier frame 138 which is fixed to the left side frame member 14 and which is slidingly supported from the main frame module 18A by a traveling support similar to support 144 illustrated in FIG. 3B.

Figure 7F:
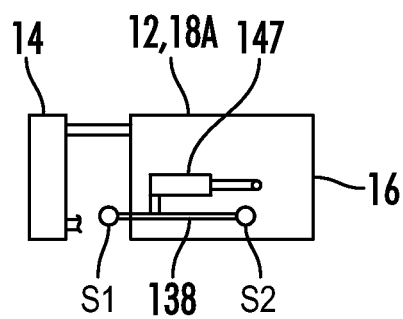

In the embodiment of FIG. 7F, the reference objects S1 and S2 are fixed to the carrier frame 138 which is adjustable in lateral position on the main frame module 18 via travelling supports 143 and 145 and adjustment device 147.

It is also noted that analogous arrangements which are mirror images of those shown in FIGS. 6A-6F and 7A-7F may be used.

Variable Spacing Between Reference Objects S1 and S2

In all of the embodiments discussed above the distance between the two 3D stringless reference objects S1 and S2 is fixed. Such arrangements are compatible with commercially available GNSS and total station based guidance systems which are configured to determine the location and orientation of an object, such as machine 10, within an external reference system based upon the locations of two points having a fixed spacing. Also from the known geometry of the machine 10, the location of those two points determines the location of all other points on the machine 10 within the external reference system.

Figure 10:
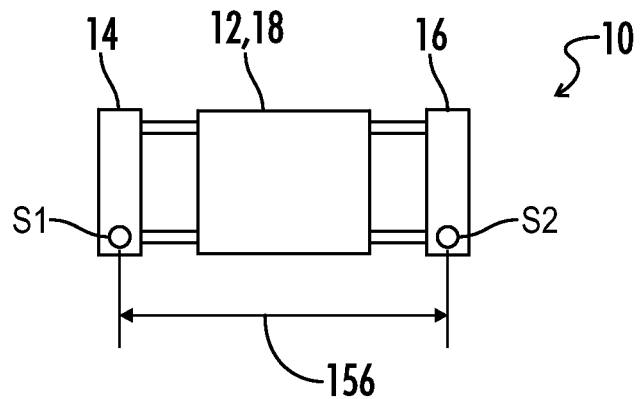
FIG. 10 is a schematic plan view similar to FIG. 6A illustrating alternative locations of the 3D stringless reference objects having a variable spacing between the objects on a dual telescoping slipform paver apparatus like that of FIGS. 1-3.

FIG. 10 is a schematic plan view similar to FIG. 6A, but illustrating a dual telescoping machine frame which has the two 3D stringless reference objects S1 and S2 mounted on the machine frame such that a distance 156 between the objects S1 and S2 is variable. In this embodiment, the controller 112 of FIG. 9 will include a controller module 158 as part of the computer program 125. The controller module 158 is configured to detect the variable distance 156 between the two reference objects S1 and S2 based upon the input signals corresponding to the positions of the two 3D stringless reference objects S1 and S2 in the external reference system. In this embodiment the controller module 158 provides the width sensor configured to generate a width signal corresponding to a change in frame width or paving width. The controller module 158, in addition to determining the variable distance 156 between reference objects S1 and S2, must be compatible with the overall guidance system which determines the position of all of the points on the machine 10 within the external reference system based upon the locations of S1 and S2 and the variable distance 156 between those locations.

In the embodiment of FIG. 10, one reference object S1 is fixed relative to the laterally movable first side frame member 14 and the other reference object S2 is fixed relative to the laterally movable second side frame member 16.

Figure 11:
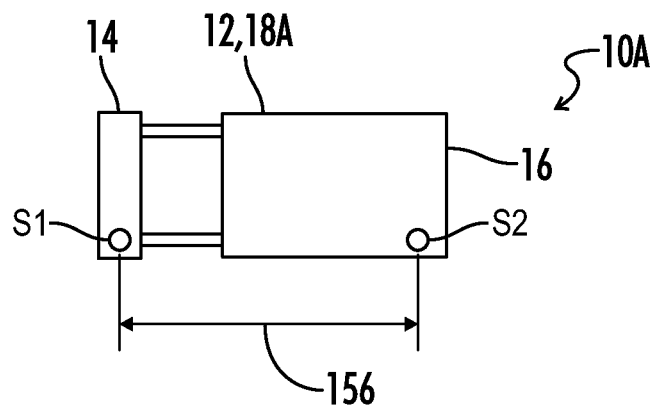
FIG. 11 is a schematic plan view similar to FIG. 7A illustrating alternative locations of the 3D stringless reference objects having a variable spacing between the objects on a single telescoping slipform paver apparatus like that of FIG. 5.

In the embodiment of FIG. 11, one reference object S1 is fixed relative to laterally movable first side frame member 14 and the other reference object S2 is fixed relative to the main frame module 18A.

Also, in some embodiments it may be desirable to fix the position of the two reference objects S1 and S2 relative to the two mold parts 52 and 54, respectively.

Embodiments like those of FIG. 10 and FIG. 11 can simplify the overall arrangement of reference objects and width sensors because the two variably spaced reference objects S1 and S2 can provide the dual function of both determining the location and height and direction of the machine 10 in the external reference system, and sensing the variable spacing of the objects S1 and S2 corresponding to changes in frame width and paving width. This may eliminate the need for a third sensor S3, also referred to as a width sensor.

It is noted that even in a system like that of FIG. 10 or FIG. 11 having a variable spacing between the reference objects S1 and S2, and including the controller module 158, it may be desirable to also use an additional width sensor S3 of any one of the types described herein. The additional width sensor S3 can provide a way to confirm the distance variations detected between the reference objects S1 and S2.

Methods of Operation

Utilizing the systems described above, a method of operating a slipform paving machine 10 is provided which permits the slipform paving machine 10 to move forward in the operating direction 34 and to mold the concrete 68 into a concrete slab structure 62 extending between the ground engaging units 40 and behind the concrete mold 52, 54. The width of the concrete slab structure 62 may be varied on the fly as the paving machine moves forward.

A human operator of the machine 10 may input to the controller 112 a desired or preset three dimensional path for the machine 10 within the external reference system. The path will correspond to a desired elevation, direction, cross slope and width of the concrete structure to be molded by the paving machine 10. The path may include a variable width for the concrete slab structure.

Based on inputs corresponding to the positions in the external reference system of the reference objects S1, S2, S3, and the other signal inputs described herein, the controller 112 can determine any deviation of the machine 10 from the desired path and the controller 112 can control the steering, height, cross slope and paving width of the machine 10 so that the actual path of the machine corresponds to the preset path.

As the concrete slab 62 is being molded, a primarily guidance for the slipform paving machine 10 can be provided by sensing a location in the external reference system (either the optical based system 100 or satellite based system 102) of the 3D stringless reference objects S1 and S2, each of which is fixed relative to at least one of the main frame module 18 and one of the laterally extendable side frame members 14 and/or 16. The height and direction of the machine frame 12 within the external reference system may be controlled by the controller 112 in response to signals corresponding to the positions of the reference objects S1 and S2.

In embodiments having a fixed distance between the two reference objects S1 and S2, as described above with regard to FIGS. 1-7, both of the reference objects S1 and S2 will be fixed relative to the same one of the main frame module 18 or one of the laterally extendable side frame members 14 or 16. In embodiments having a variable distance 156 between the two reference objects S1 and S2 as described above with regard to FIGS. 10 and 11, each of the reference objects S1 and S2 will be fixed relative to a different one of the main frame module 18 or one of the laterally extendable side frame members 14 or 16.

As the concrete slab 62 is being formed, the frame width 32 may be adjusted on the fly to thereby adjust the mold width 78 and similarly adjust a slab width 146 of the concrete slab 62 as schematically illustrated in FIGS. 8A, 8B and 8C. Alternatively, in some embodiments the mold width may be adjusted independently of the frame width. These adjustments may be automatically made by controller 112 in response to width signals from reference object S3, or from other width sensors described herein, and in accordance with the predetermined path which has been input into the controller 112.

As the concrete slab 62 is being formed, the cross slope may also be adjusted. This adjustment may be automatically made by controller 112 in response to cross slope signals from sensor 122 and in accordance with the predetermined path which has been input into the controller 112.

FIG. 8A schematically illustrates a slab 62 having a first slab width 146 and a second slab width 148.

As the slipform paving machine 10 moves forward in the direction 34, when the mold 52, 54 reaches a first location 149, the actuators 24, 26, 28 and 30 are actuated to continuously adjust the frame width 32 and thus the mold width 78 as the mold 52, 54 moves through a transition distance 150 thus forming a continuous transition 152 in the concrete slab structure 62 from the first slab width 146 to the second slab width 148.

In the embodiment schematically illustrated in FIG. 8A, the slab width is symmetrically extended on both sides of a main trajectory line 154 of the paving machine 10.

In the embodiment of FIG. 8B, the slab width is extended asymmetrically to one side of the main trajectory 154.

In the embodiment of FIG. 8C, the slab width is extended asymmetrically to both sides of the main trajectory 154.

Similarly, the slab width may be decreased as the paving machine 10 moves forward in a manner analogous to any of FIGS. 8A-8C.

Also, as noted above regarding the embodiment of FIG. 3C, it may be desirable to maintain the carrier frame 138 position so as to equally span the main trajectory 154, even if there is an asymmetric telescoping of the frame 12. This is accommodated by the variable positioned carrier frame 138 of FIG. 3C as is schematically illustrated in FIG. 3D.

Figure 3D:
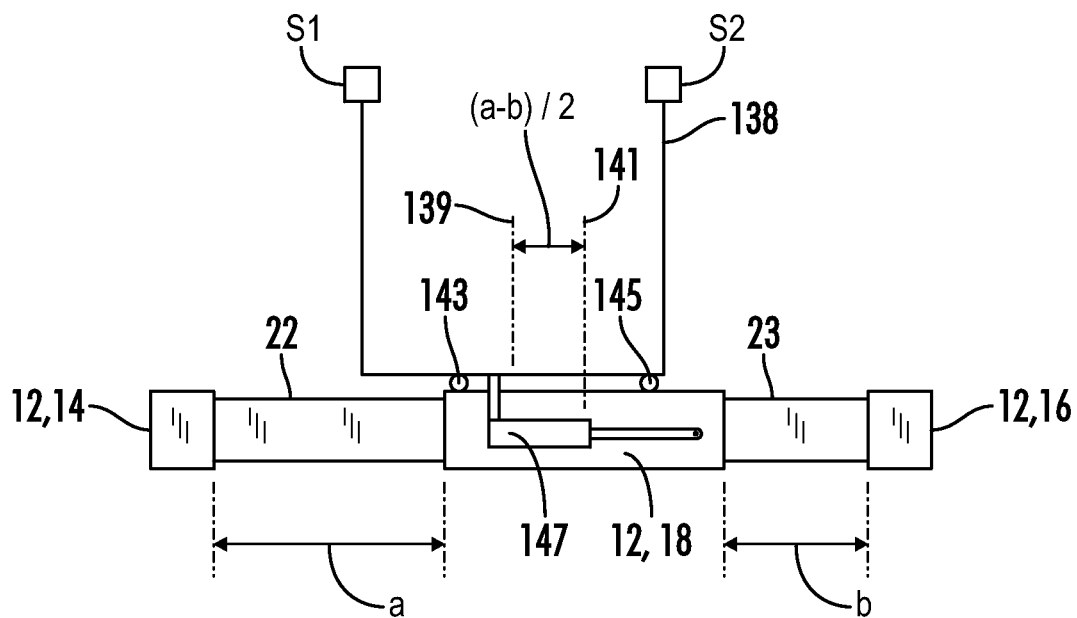
FIG. 3D is a schematic view corresponding to the embodiment of FIG. 3C and illustrating the central positioning of the carrier frame to span a main trajectory of the machine when the expandable frame is laterally expanded in an asymmetric manner.

FIG. 3D schematically illustrates the frame arrangement of FIG. 3C in an asymmetric telescoping mode relative to the main trajectory 154 of the concrete slab schematically illustrated in FIG. 8A. In FIG. 3D it can be seen that the left side frame member 14 has been extended relative to main frame module 18 by a distance "a", whereas the right side frame member 16 has been extended relative to main frame module 18 by a lesser distance "b". In order to maintain the carrier frame 138 centrally straddled on the main trajectory 154, the adjustment device 147 shifts a center line 139 of the carrier frame 138 to the left relative to a center line 141 of the main frame module 18 by the distance (a−b)/2.

Thus it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art, which changes are encompassed within the scope and spirit of the present invention as defined by the appended claims.

What is claimed is:

1. A slipform paving machine apparatus, comprising:
   a machine frame including first and second side frame members, the machine frame being variable in frame width;
   at least one first side ground engaging unit and at least one second side ground engaging unit, at least one of the ground engaging units being steerable to control a direction of the paving machine apparatus;
   front and rear first side height adjustable supports supporting the first side frame member from the at least one first side ground engaging unit;
   at least one second side height adjustable support supporting the second side frame member from the at least one second side ground engaging unit;
   a mold supported from the machine frame beneath the machine frame and laterally between the at least one first side ground engaging unit and the at least one second side ground engaging unit, the mold being configured to mold concrete into a concrete structure having an upper surface and lateral concrete sides as the machine moves forward in an operating direction, the mold being variable in mold width so as to vary a paving width of the concrete structure;
   at least two three-dimensional (3D) stringless reference objects configured to correspond to positions of at least two points on the machine frame relative to an external reference system;
   a width actuator configured to vary the paving width;
   a width sensor configured to generate a width signal corresponding to a change in the paving width; and
   a controller configured to receive input signals corresponding to the positions of the 3D stringless reference objects in the external reference system, and to receive the width signal from the width sensor, the controller also configured to control height adjustment of one or more of the height adjustable supports, to control steering of the at least one steerable ground engaging unit, and to control the width actuator so that the paving width can be varied as the machine moves forward in the operating direction.

2. The apparatus of claim 1, wherein:
the machine frame includes a main frame module, and at least one of the side frame members is laterally movable relative to the main frame module to vary the frame width.

3. The apparatus of claim 2, wherein:
both of the side frame members are laterally movable relative to the main frame module to vary the frame width.

4. The apparatus of claim 1, wherein:
a distance between the at least two 3D stringless reference objects is fixed.

5. The apparatus of claim 4, wherein:
the width sensor comprises an additional 3D stringless reference object configured such that the additional 3D stringless reference object moves relative to the at least two 3D stringless reference objects when the paving width is varied.

6. The apparatus of claim 4, wherein:
the width sensor comprises an extension sensor configured to detect an extension of the paving width.

7. The apparatus of claim 4, wherein:
the width sensor comprises a stringline sensor mounted on the machine frame such that the stringline sensor moves relative to the at least two 3D stringless reference objects when the frame width is varied, so that a stringline fixed in the external reference system can be used to control changes in frame width.

8. The apparatus of claim 4, wherein:
the at least two 3D stringless reference objects are spaced apart longitudinally with a spacing component parallel to the operating direction.

9. The apparatus of claim 8, wherein:
the at least two 3D stringless reference objects are longitudinally fixed relative to one of the side frame members.

10. The apparatus of claim 8, wherein:
the machine frame includes a main frame module, and at least one of the side frame members is laterally movable relative to the main frame module to vary the frame width; and
the at least two 3D stringless reference objects are longitudinally fixed relative to the main frame module.

11. The apparatus of claim 4, wherein:
the at least two 3D stringless reference objects are spaced apart laterally with a spacing component perpendicular to the operating direction.

12. The apparatus of claim 11, wherein:
the machine frame includes a main frame module, and at least one of the side frame members is laterally movable relative to the main frame module to vary the frame width; and
the at least two 3D stringless reference objects are laterally fixed relative to the main frame module.

13. The apparatus of claim 11, wherein:
the machine frame includes a main frame module, and at least one of the side frame members is laterally movable relative to the main frame module to vary the frame width; and the at least two 3D stringless reference objects are laterally fixed relative to the at least one laterally movable side frame member.

14. The apparatus of claim 11, wherein:
the machine frame includes a main frame module, and at least one of the side frame members is laterally movable relative to the main frame module to vary the frame width; and
the machine further includes a carrier frame having the at least two 3D stringless reference objects fixedly attached to the carrier frame so that the distance between the at least two 3D stringless reference objects is fixed, the carrier frame being fixed relative to one of the main frame module and the at least one laterally movable side frame member.

15. The apparatus of claim 14, wherein:
the carrier frame is fixed relative to the at least one laterally movable side frame member; and
the machine further includes a travelling support between the carrier frame and the main frame module for supporting the carrier frame from the main frame module while allowing relative lateral movement between the carrier frame and the main frame module.

16. The apparatus of claim 11, wherein:
the machine frame includes a main frame module, and at least one of the side frame members is laterally movable relative to the main frame module to vary the frame width; and
the machine further includes a carrier frame having the at least two 3D stringless reference objects fixedly attached to the carrier frame so that the distance between the at least two 3D stringless reference objects is fixed, the carrier frame being supported from the main frame module and being laterally adjustably positioned relative to the main frame module.

17. The apparatus of claim 1, wherein:
the at least two 3D stringless reference objects include global navigation satellite system (GNSS) sensors.

18. The apparatus of claim 1, wherein:
the at least two 3D stringless reference objects include reflectors for a ground based optical surveying system.

19. The apparatus of claim 1, wherein:
one of the at least two 3D stringless reference objects includes a global navigation satellite system (GNSS) sensor and the other of the at least two 3D stringless reference objects includes a reflector for a ground based optical surveying system.

20. The apparatus of claim 1, further comprising:
a cross slope sensor mounted on the machine frame; and
wherein the controller is configured to generate a cross slope adjustment signal to control a cross slope of the machine frame by adjustment of one or more of the height adjustable supports.

21. The apparatus of claim 1, wherein:
the width actuator includes a piston and cylinder configured to extend and contract the frame width.

22. The apparatus of claim 1, wherein:
the width actuator includes a steering system configured to steer the ground engaging units relative to each other so as to vary the frame width.

23. The apparatus of claim 1, wherein:
the at least two 3D stringless reference objects are mounted relative to the machine frame such that a distance between the at least two 3D stringless reference objects is variable; and
the width sensor comprises a controller module configured to detect the distance between the at least two 3D stringless reference objects based upon the input signals corresponding to the positions of the at least two 3D stringless reference objects in the external reference system.

24. The apparatus of claim 23, wherein:
the machine frame includes a main frame module, and at least one of the side frame members is laterally movable relative to the main frame module to vary the frame width; and
one of the at least two 3D stringless reference objects is fixed relative to the at least one laterally movable side frame member, and the other of the at least two 3D stringless reference objects is fixed relative to the main frame module.

25. The apparatus of claim 23, wherein:
the machine frame includes a main frame module, and both of the side frame members are laterally movable relative to the main frame module to vary the frame width; and
one of the at least two 3D stringless reference objects is fixed relative to each of the side frame members.

26. The apparatus of claim 1, wherein:
the mold is attached to the frame such that the mold varies in mold width as the frame width is varied, and thus the paving width varies as the frame width is varied.

* * * * *

UNITED STATES PATENT AND TRADEMARK OFFICE
CERTIFICATE OF CORRECTION

Page 1 of 1

PATENT NO. : 9,551,115 B2
APPLICATION NO. : 14/576399
DATED : January 24, 2017
INVENTOR(S) : Engels et al.

It is certified that error appears in the above-identified patent and that said Letters Patent is hereby corrected as shown below:

On the Title Page

Item (72) Inventors is corrected to read:
Michael Engels, Obererbach (DE);
Matthias Fritz, Linz/Rhein (DE);
Martin Lenz, Grossmaischeid (DE)

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*